Nov. 17, 1925.
J. M. RUSSELL
PARACHUTE
Filed May 19, 1924
1,562,258
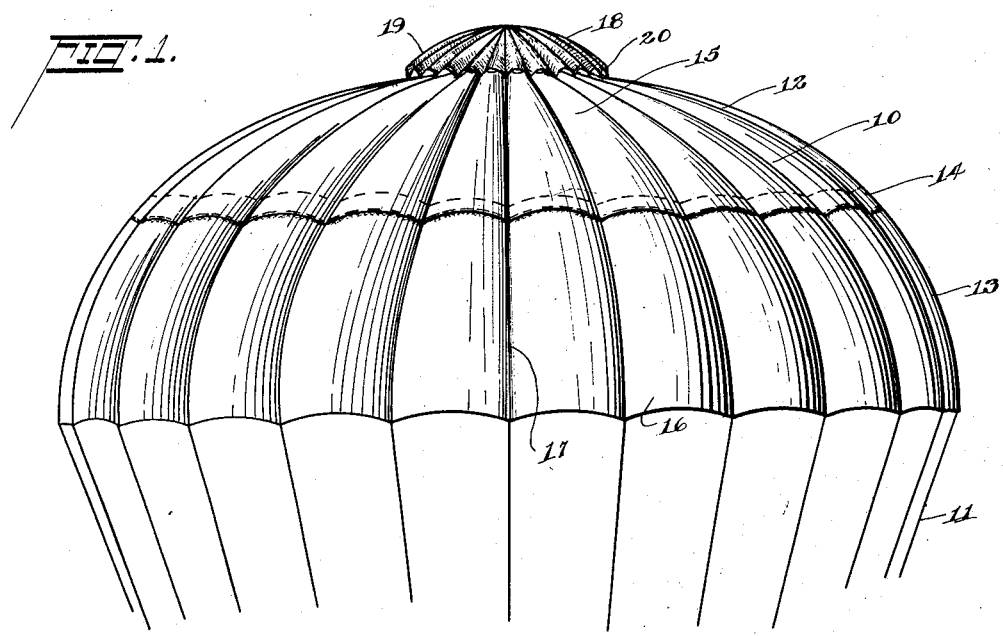
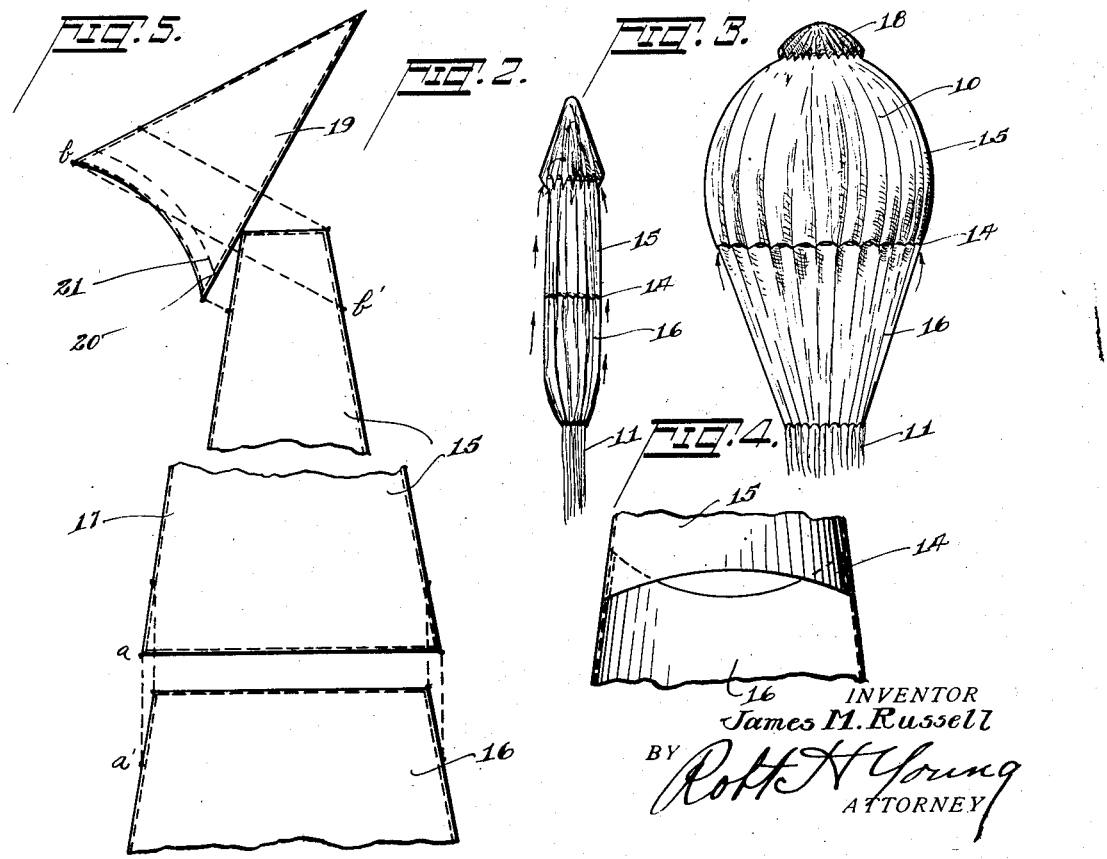
INVENTOR
James M. Russell
BY
ATTORNEY Patented Nov. 17, 1925.

1,562,258

UNITED STATES PATENT OFFICE.

JAMES M. RUSSELL, OF DAYTON, OHIO.

PARACHUTE.

Application filed May 19, 1924. Serial No. 714,461.

*To all whom it may concern:*

Be it known that I, JAMES M. RUSSELL, a citizen of the United States, residing at Dayton, in the county of Montgomery and State of Ohio, have invented certain new and useful Improvements in Parachutes, of which the following is a specification.

This invention relates to parachutes wherein the improvements are directed toward providing a parachute which is positive in the operation of openings, regardless of any twisting or entanglement of the shrouds.

The parachutes heretofore used were objectionable in that a slight entanglement or twisting of the shrouds at the time of launching was usually fatal as it prevented the proper entry of the air into the bottom of the parachute during descent. The present invention provides a parachute which does not rely for its opening upon the air entering the bottom but has a system of vents in the peak of the parachute to cause the initial opening thereof, and valve-controlled openings in the canopy sensitive to a difference in pressure between the inside and outside of the parachute for furthering the opening thereof.

More specifically, the parachute of the present invention is provided with annular valve openings in the panels of the parachute provided by overlapping portions of the panels which serve to admit air to the interior of the parachute, to quicken the opening thereof. The invention further takes advantage of the fact that parachutes open from the top downwardly, and provides a peak closure which not only prevents a central upward draft through the parachute, as usually occurs in ordinary parachutes, when the shrouds become twisted, but also affords a means for catching the air and inducing it to enter the top of the parachute and spread the upper portion into a pear shape, the additional air necessary for completely opening the parachute being then provided through the bottom and through the annular valve openings in the canopy of the parachute.

The invention is illustrated in the accompanying drawing, in which:

Fig. 1 is a view of an opened parachute constructed in accordance with the invention.

Figs. 2 and 3 are views illustrating respectively a first and an intermediate stage in the opening of the parachute.

Fig. 4 is a fragmentary enlarged elevational detail of one of the valves in the canopy shown fully opened, and Fig. 5 is a diagrammatic view of a disassembled panel showing the manner of assembling the same.

Throughout the views the same reference numerals are applied to the same parts.

The parachute, to which the present improvements are directed, is of the standard service type used in the U. S. Army and Navy and carried in a pack usually on the person of the aviator. The present parachute includes a canopy 10, and shrouds 11, and it is understood that a pilot parachute, not shown, for withdrawing the parachute from the pack will be provided. The canopy 10, it is contemplated, may be made of two or more concentric sections 12 and 13 although only two are illustrated. These sections overlap at 14 and are sewed together on radial lines so as to provide in effect an annular valve in the wall of the canopy. The sections 12 and 13 are composed of a plurality of panels 15 and 16 of a material suited to this purpose, which are sewed together at their lateral edges and secured to cords 17, which may constitute extensions of the shrouds 11, extending radially continuously from the outer edge of the panels 16 to the inner edge of the panels 15. The cords serve both to secure the panels 15 and 16 together, and as a reinforcement for the parachute canopy. The panels 15 and 16 are of approximately the same width at the point 14 where they overlap so that a flap valve effect is secured. The panels 15 and 16 open when there is a difference in pressure between the inside and the outside of the parachute, at the time the parachute is opening, as will presently be pointed out, but lie against one another and seal the openings when the parachute is fully opened.

The peak of the parachute is not open, as is often the case in conventional types of parachutes at present in use. Instead, a closure 18 is provided which is somewhat oversize in dimensions, as indicated, consisting of a plurality of radial panels 19 sewed similarly to the panels 15 and 16 at their lateral edges, and preferably joined with the inner ends of the cords 17. The panels 19 overlap the inner ends of the panels 15 at 20 providing air vents due to the panels 19 being wider than the panels 15 at the point where they are joined. The edges of the panels 19 are made stiff by the sewing on of webbing 21 in order to stand out in full plaits which in the first stage of opening of the parachute as shown in Fig. 2, catch the upward draft as the parachute descends and cause it to enter into the upper portion of the parachute and bulge the same into a pear shape, approximately as shown in Fig. 3. Once the parachute has assumed this form, the opening thereof is furthered by the air entering through the annular valve and at the bottom of the parachute. The inner ends of the cords 17 in connection with the webbing 21 on the comparatively narrow panels 19, makes the peak 18 have greater body than the comparatively limp canopy portion. This of course assists materially in the opening of the parachute for this portion of the parachute tends to spread out to assume an open position.

The parachute construction if not already clear from the foregoing description, may be more readily understood by a study of Fig. 5, showing the panels 15, 16 and 19 with the ends in proper relation to be joined. The panel 15, it will be noted, is of the same width as the panel 16 where the two are joined. The panel 15 is sewed in overlapping relation with the end of the panel 16, the point $a$ of panel 15 being brought down to the point $a'$, of panel 16. The panel 19, it will be noted, is considerably wider than the panel 15 where it is joined to the latter. To illustrate this most clearly, the panel 19 is shown inverted about one edge of the panel 15. It will be clear that the panel 19 overlaps the panel 15 when the point $b$ of the panel 19 is brought down over point $b'$ of panel 15 and the other points are simiarly correlated as indicated. It will be noted here that the lower edge of the panel 19 is cut on an arc. This causes the bottoms of the plaits to open away from the panels 15 as shown in Fig. 2 in the first stages of opening of the parachute, and subsequently to have a substantial portion open to permit the escape of air at the peak of the parachute despite the fact that the panels 15 are bulged in the full open position of the parachute as shown in Fig. 1. If the lower ends of the panels 19 were to be cut straight, it is likely there would be no air vents left in the full open position of the parachute shown in Fig. 1 due to the bulged panels 15 closing the air vents.

The present parachute operates quite differently from most conventional types. In the conventional type of parachute, the peak is open to serve as an air vent. At the time the parachute is launched, everything depends upon the proper relationship of the shrouds with the bottom of the parachute so that the bottom is free to open and admit air readily. In case the aviator should take a spiral course due to his having turned, for example, at the time he jumps, the shrouds might have a few turns in them and this would hinder or prevent the opening out of the bottom of the parachute so that no air could be admitted. In such cases, there was an upward draft through the canopy and out through the peak opening and usually the parachute would fail to open, as the parachute in descending would have the air acting on the outside tending to crush it rather than to permit the parachute to open. In the present invention, it will be seen that there is no opportunity for the action just described to occur. The peak of the parachute is closed and relatively small air vents are provided at the edges of the peak closure. At the time the parachute is launched, when it assumes approximately the condition shown in Fig. 2, the parachute peak closure descending catches the air moving relatively to the parachute as indicated by the arrows and causes it to enter within the parachute peak. This opens the upper portion of the parachute into a pear shape somewhat as shown in Fig. 3. The instant this occurs the bottom of the parachute is opened somewhat even though the shrouds may be twisted. Under actual test conditions, where the shrouds had many times the number of twists found to be fatal in the conventional type of parachute, the parachute opened at the bottom sufficiently to admit air to such an extent that the parachute opened and actually unwound the twisted shrouds. At this time also the annular valve 14 is wide open as shown in Figs. 3 and 4 due to the pressure within the parachute being less than the external pressure. Air is caught by the valve 14 and this air in conjunction with what air enters the bottom of the parachute opens the parachute to the full open position shown in Fig. 1. After this condition is obtained, the annular valve at 14 is tightly closed since the internal pressure is greater than the external pressure and the overlapping portions of the panels are pressed tightly together by the air pressure. There is a regulated escape of a small amount of air through the air vents at 20 at the edges of the closure 18 to relieve sudden applications of unusually great pressures.

It is not at all necessary to use the annular valves in the position as shown which is about midway between the peak and the lateral extremity. Two or more such annular valves may be used if more rapid opening of the parachute is desired, and in such case they should be located rather nearer the upper portion of the canopy to aid in the initial start of the opening of the parachute, especially where the type of air vents as shown at 18 in Fig. 1 is not used. It is to be noted that it is not necessary to use the type of air vent as shown at 18 in Fig. 1 in conjunction with the annular valve as shown in Fig. 4, although the use of both types of opening devices together insures an exceedingly rapid opening of the parachute. In actual test a parachute using a construction shown opens so quickly that the operation almost appears to take place the instant it is exposed to the air.

I claim:—

1. A parachute comprising a canopy made up of a plurality of concentric sections having overlapping portions joined together at spaced points to provide a vent therebetween.

2. A parachute comprising a plurality of overlapping concentric canopy sections joined together along radial lines at the overlapping portions thereof and providing a vent therebetween.

3. A parachute comprising a plurality of overlapping concentric canopy sections joined together along radial lines and providing a flap valve therebetween, and a central closed peak section of oversize dimensions overlapping the innermost canopy section and joined thereto.

4. A parachute comprising a plurality of overlapping concentric canopy sections joined together and providing a flap valve therebetween capable of closing, and a central peak section overlapping the innermost canopy section and joined thereto to provide open vents.

5. In a parachute, a canopy having a valve in the wall thereof sensitive to differences in pressure between the inside of said parachute and the outside thereof to further the opening of said parachute.

6. In a parachute, a canopy having a peak closure overlapping the inner part of said canopy and attached thereto to provide pockets, to catch air and direct it to the top of said parachute to further the opening thereof.

7. In a parachute, a canopy having a peak closure overlapping the inner part of said canopy and attached thereto along radial lines to provide pockets to catch air.

8. In a parachute, a canopy comprising a plurality of concentric radially positioned panels attached together in over-lapping relation along their radial edges only, with the upper panel outside of the lower panel at the point of attachment, the upper of said panels being wider than the lower panel at the point of attachment to provide a fullness in the upper panel portion to catch the air when descending.

9. In a parachute, a canopy having a peak closure overlapping the inner edges of said canopy and joined thereto to provide open vents, the said closure projecting beyond the sides of the unopened parachute canopy in the launching of the parachute to serve to catch air and direct it through said vents to the inside of said parachute to further the opening thereof.

10. In a parachute, a canopy comprising a plurality of concentric radially positioned panels attached together in over-lapping relation along their radial edges only, with the upper panel outside of the lower panel at the point of attachment, the upper of said panels being wider than the lower panel at the point of attachment to provide a fullness in the upper panel portion to catch the air when descending, the overlapping edge of the overlapping portion of said upper panel being downwardly curved towards its radial edges.

11. In a parachute, a canopy having a peak closure overlapping the inner edges thereof and joined thereto providing vents, said closure being constructed to have greater body than the comparatively limp structure of the canopy and being of oversize dimensions to protrude in full plaits from the outer surface of the canopy.

12. In a parachute, a canopy composed of radial panels joined together along radial lines, in free overlapping relation at the outer end with other radial panel pieces similarly joined together, some of said panels and panel pieces being attached together at spaced points to provide one way valves between the points of attachment.

13. In a parachute, a canopy composed of radial panels joined together along radial lines at the outer end in free overlapping relation with other radial panel pieces similarly joined together, the overlapping portions being of approximately the same width, some of said panels and panel pieces being attached together at spaced points to provide one way valves between the points of attachment.

14. In a parachute, a canopy composed of radial panels joined together along radial lines in free overlapping relation at the outer end with other radial panel pieces similarly joined together and continuous reinforcing means extending radially the overall length of the aforesaid panels, some of said panels and panel pieces being attached together at spaced points to provide one way valves between the points of attachment.

15. In a parachute, a canopy composed of keystone-shaped radial panels joined together at their lateral edges, in overlapping relation at their outer ends with outer panel sections and joined therewith at their lateral edges to provide one-way air valves, and a peak closure made of radial panels overlapping the inner ends of the first mentioned panels and joined therewith at their lateral edges.

16. In a parachute, a canopy composed of keystone-shaped radial panels joined together at their lateral edges, in overlapping relation at their outer ends with outer panel sections and joined therewith at their lateral edges to provide one-way air valves, said panels being of approximately the same width where joined, and a peak closure made of radial panels overlapping the inner ends of the first mentioned panels and joined therewith at their lateral edges, said closure panels being wider than the first mentioned canopy panels at the point where the two are joined.

17. In a parachute, a canopy composed of keystone-shaped radial panels joined together at their lateral edges, in overlapping relation at their outer ends with outer panel sections and joined therewith at their lateral edges to provide one-way air valves, and a peak closure made of radial panels overlapping the inner ends of the first mentioned panels and joined therewith at their lateral edges, and continuous reinforcing means extending radially the length of all of said panels between the sets of panels.

18. In a pack type parachute, a canopy having a one-way valve in the wall thereof at a point substantially removed from the peak portion.

19. In a parachute, a canopy having a one-way valve in the wall thereof automatically closed as the parachute opens.

20. In a parachute, a canopy having a peak, a concentric opening in the wall of the canopy, and means to close said opening as the parachute opens.

In testimony whereof I affix my signature.

JAMES M. RUSSELL.